United States Patent

Voloshin

[11] Patent Number: 5,961,619
[45] Date of Patent: Oct. 5, 1999

[54] METHOD AND APPARATUS FOR AUTOMATIC ACTIVATION OF BUS TERMINATION ON A FAST ETHERNET REPEATER STACK

[75] Inventor: Moshe Voloshin, Sunnyvale, Calif.

[73] Assignee: Cisco Technology, Inc., San Jose, Calif.

[21] Appl. No.: 08/965,330

[22] Filed: Nov. 6, 1997

Related U.S. Application Data

[60] Provisional application No. 60/058,611, Sep. 10, 1997, and provisional application No. 60/062,391, Oct. 7, 1997.

[51] Int. Cl.$^6$ .................... G06F 13/00; G06F 15/173; H04B 3/36; H04L 25/20
[52] U.S. Cl. .................... 710/101; 375/211; 326/30
[58] Field of Search .................... 710/101, 100, 710/129, 8; 709/223, 221; 326/30; 375/211; 370/492, 502; 340/825.06

[56] References Cited

U.S. PATENT DOCUMENTS

| | | | |
|---|---|---|---|
| 3,657,478 | 4/1972 | Andrews, Jr. .................... | 178/63 E |
| 3,800,097 | 3/1974 | Maruscak et al. .................... | 361/791 |
| 4,837,788 | 6/1989 | Bird .................... | 375/211 |
| 5,313,595 | 5/1994 | Lewis et al. .................... | 395/306 |
| 5,495,584 | 2/1996 | Holman, Jr. et al. .................... | 395/308 |
| 5,822,594 | 10/1998 | Leung .................... | 395/750.01 |
| 5,852,635 | 12/1998 | Crane .................... | 375/264 |

OTHER PUBLICATIONS

Network Systems Tutorial for IEEE Std 802.3, Repeater Functions and System Design Topology Considerations for Carrier Sense Multiple Access with Collision Detection (CSMA/CD) Local Area Networks (LANs); Section 4, Repeater Functions, pp. 7–14 (1995).

International Standard ISO/IEC 8802–3: 1996(E) ANSI/IEEE Std 802.3, 1996 Edition; Carrier sense multiple access with collision detection (CSMA/DC) access method and physical layer specifications; Section 9, Repeater unit for 10 Mb/s baseband networks, pp. 125–155.

*Primary Examiner*—Gopal C. Ray
*Attorney, Agent, or Firm*—Ritter, Van Pelt and Yi LLP

[57] ABSTRACT

An automatically activated bus termination circuit in a repeater which is suitable for inclusion in a repeater stack including an end unit determination circuit. The end unit determination circuit includes a local input connector having an input sense pin. The input sense pin is configured to be connected to an input sense potential when the local input connector is connected to a remote output connector having an output sense pin. The output sense pin is configured to be connected to an output sense potential when the local output connector is connected to a remote input connector. The bus termination circuit is configured to be active when either the input sense pin is not connected to the input sense potential or the output sense pin is not connected to the output sense potential. As a result, the bus termination circuit is activated when a stack bus connection cable is not connected from the local output connector to a remote input connector or when a stack bus connection cable is not connected from the local input connector to a remote output connector.

20 Claims, 6 Drawing Sheets

METHOD AND APPARATUS FOR AUTOMATIC ACTIVATION OF BUS TERMINATION ON A FAST ETHERNET REPEATER STACK

CROSS REFERENCE TO RELATED APPLICATIONS

This application claims priority to U.S. Provisional Patent Application No. 60/058,611, filed Sep. 10, 1997 and U.S. Provisional Patent Application Serial No. 60/062,391, filed Oct. 7, 1997.

This application is related to co-pending U.S. patent application Ser. Nos. 08/965,479, 08/964,602, 08/964,601, 08/965,320, 08/965,460, and 08/965,323, filed concurrently herewith, which are incorporated herein by reference for all purposes.

BACKGROUND OF THE INVENTION

1. Field of the Invention

The present invention relates generally to methods and apparatuses for automatic activation of bus termination on a Fast Ethernet repeater stack. More specifically, the invention relates to methods and apparatuses for automatically determining which repeaters from of a group of repeaters in a Fast Ethernet repeater stack happen to be plugged into the end of the stack. A top repeater and a bottom repeater are identified and a termination circuit is activated and connected to the bus for each of those repeaters so that the bus is terminated at the repeaters at the ends of the stack. This prevents reflections of signals on the bus that would otherwise occur and degrade the performance of the bus. Because the top and bottom Fast Ethernet repeaters are determined automatically, it is not necessary for a system administrator to configure the stack or to connect a termination plug to the top and bottom machines.

2. Description of the Related Art

The growth of local-area networks (LANs) has been driven by the introduction of Ethernet Technology as well as the availability of powerful, affordable personal computers and workstations. As a result, applications that once were possible only on mainframe computers are now running on LANs. Network speed and availability are critical requirements. However, existing applications and a new generation of multimedia, groupware, imaging, and database products can tax a network running at Ethernet's traditional speed of 10 megabits per second (Mbps). Moreover, with more applications requiring faster LAN speeds for acceptable performance, network managers increasingly find that high-performance computation platforms and mission-critical applications can overwhelm a 10 Mbps network. Network managers therefore are increasingly implementing high-speed LAN technology.

Fast Ethernet THERNET

For organizations with existing Ethernet installations, increasing the network speed to 100 Mbps is preferable to investing in a completely new LAN technology. This user preference has driven the industry's decision to specify a higher-speed Ethernet that operates at 100 Mbps. This higher-speed Ethernet is known as Fast Ethernet.

In July 1993, a group of networking companies joined to form the Fast Ethernet Alliance. The charter of the group was to draft the 802.3u 100BaseT specification ("802.3 specification") of the Institute of Electrical and Electronics Engineers (IEEE) and to accelerate market acceptance of Fast Ethernet technology. The final IEEE 802.3 specification was approved in June 1995. Among the other goals of the Fast Ethernet Alliance are: to maintain the Ethernet transmission protocol Carrier Sense Multiple Access Collision Detection (CSMA/CD); to support popular cabling schemes; and to ensure that Fast Ethernet technology will not require changes to the upper-layer protocols and software that run on LAN workstations. For example, no changes are necessary to Simple Network Management Protocol (SNMP) management software or Management Information Bases (MIBs) in order to implement Fast Ethernet.

Other high-speed technologies, such as 100VG-AnyLAN and Asynchronous Transfer Mode (ATM), achieve data rates in excess of 100 Mbps by implementing different protocols that require translation when data moves to and from 10BaseT. Protocol translation requires changing the frame, which often incurs higher latencies when passing through layer 2 (data-link layer) LAN switches.

In many cases, organizations can upgrade to 100BaseT technology without replacing existing wiring. Options for 100BaseT media are the same as those for 10BaseT. They include shielded and unshielded twisted pair (STP and UTP) and fiber. The Media Independent Interface (MII) provides a single interface that can support external transceivers for any of the 100BaseT physical sublayers.

CSMA/CD

Carrier sense-collision detection is widely used in LANs. Many vendors use this technique with Ethernet and the IEEE 802.3 specification. A carrier sense LAN considers all stations as peers; the stations contend for the use of the channel on an equal basis. Before transmitting, the stations monitor the channel to determine if the channel is active (that is, if another station is sending data on the channel). If the channel is idle, any station with data to transmit can send its traffic onto the channel. If the channel is occupied, the stations must defer to the station using the channel.

Figure 1:
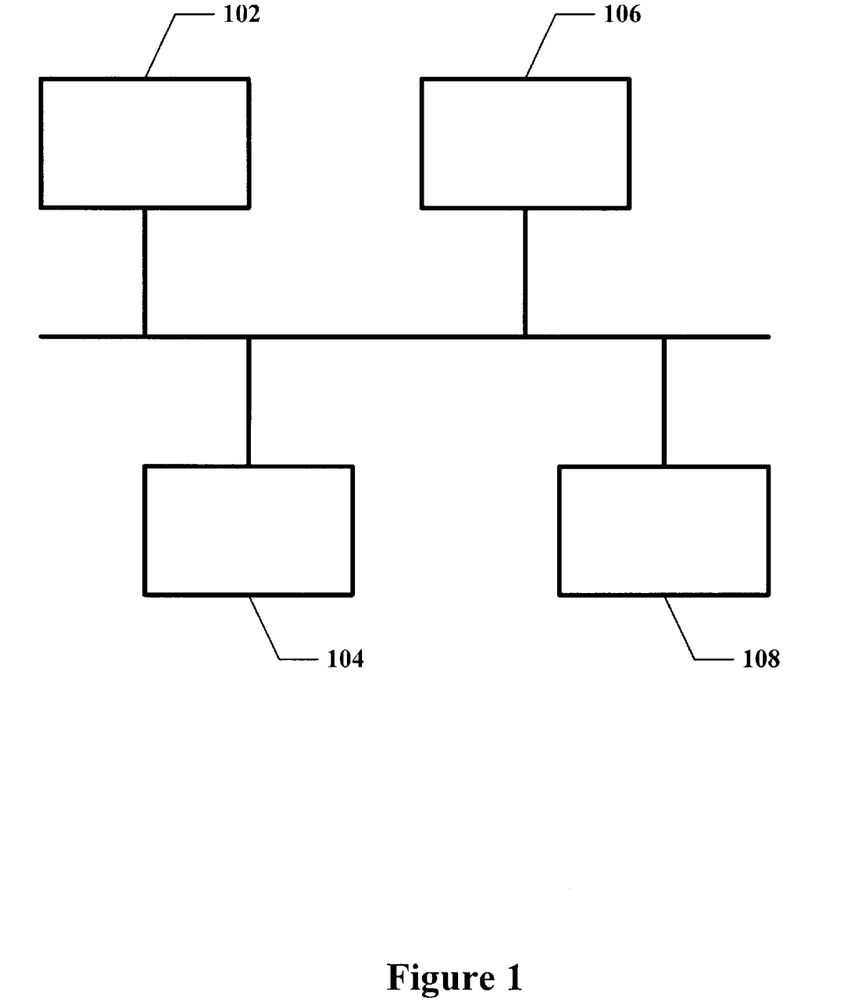
FIG. 1 is a block diagram illustrating a carrier sense-collision detection LAN.

FIG. 1 depicts a carrier sense-collision detection LAN. Network devices 102, 104, 106, and 108 are attached to a network bus 110. Only one network device at a time is allowed to broadcast over the bus, since if more than one device were to broadcast at the same time, the combination of signals on the bus would likely not be intelligible. For example, assume network devices 102 and 104 want to transmit traffic. Network device 108, however, is currently using the channel, so network devices 102 and 104 must "listen" and defer to the signal from network device 108, which is occupying the bus. When the bus goes idle, network devices 102 and 104 can then attempt to acquire the bus to broadcast their messages.

Because network device 102's transmission requires time to propagate to other network devices, these other network devices might be unaware that network device 102's signal is on the channel. In this situation, network device 102 or 104 could transmit its traffic even if network device 108 had already seized the channel after detecting that the channel was idle. This problem is called the collision window. The collision window is a factor of the propagation delay of the signal and the distance between two competing stations. Propagation delay is the delay that occurs before a network device can detect that another network device is transmitting.

Each network device is capable of transmitting and listening to the channel simultaneously. When two network device signals collide, they create voltage irregularities on the channel, which are sensed by the colliding network devices. The network devices then turn off their transmission and, through an individually randomized wait period, attempt to seize the channel again. Randomized waiting decreases the chances of another collision because it is unlikely that the competing network devices generate the same wait time.

It is important that the total propagation delay not exceed the amount of time that is required to send the smallest size data frame. This allows devices to discard data corrupted by collisions by simply discarding all partial frames. It is therefore not desirable for entire frames of data to be sent before a collision is detected. Carrier sense networks are usually implemented on short-distance LANs because the collision window lengthens as the channel gets longer. Longer channels provide opportunity for the more collisions and can reduce through-put in the network. Generally, a long propagation delay coupled with short frames and high data transfer rates give rise to a greater incidence of collisions. Longer frames can mitigate the effect of long delay, but they reduce the opportunity for competing stations to acquire the channel.

The IEEE 802.3 specification sets a standard minimum frame size of 64 bytes (512 bits). Therefore, it order for a network to comply with the standard, a station on the network must not be able to transmit 64 bytes of data before a collision is detected.

Although Fast Ethernet maintains CSMA/CD, the Ethernet transmission protocol, it reduces the transmission time for each bit by a factor of 10. Thus, the Fast Ethernet packet speed increases tenfold, from 10 Mbps to 100 Mbps. Data can move between Ethernet and Fast Ethernet without requiring protocol translation or software changes, because Fast Ethernet maintains the 10BaseT error control functions as well as the frame format and length.

Repeaters

While some Ethernet applications connect numerous network devices to a network bus that is literally a cable connecting the network devices, it is often more desirable to connect network devices using a repeater or hub. It should be noted that in the following description the term "hub" and the term "repeater" are used interchangeably. The repeater manages collision detection for the network devices so that the network devices need only broadcast messages without detecting collisions. The repeater notifies a network device when a collision occurs during its attempt to transmit. In addition, the repeater implements a star topology so that more devices can be included on the network without violating any cable length restriction and so that many devices can be added or removed from the network efficiently.

An Ethernet repeater is a device that serves as a central station for plugging network devices included in an Ethernet network, hence the term "hub." The Ethernet repeater receives messages from the network devices that are plugged into it and broadcasts (or "repeats") the message to all of the other devices on the network along a network bus if no collision is detected. The repeater monitors network traffic in its collision domain and assumes the responsibility for collision detection. The network devices thus simply broadcast messages to the repeater and do not need to first listen before sending messages. If the repeater has already assigned the network bus to a device, then it notifies the device that tried to broadcast that a collision has occurred so that the network device may try again later. The amount of time that it takes for the repeater to receive a data signal and repeat that data signal out to every port on which the data signal is to be broadcast is referred to as the latency of the repeater.

The 802.3 specification contains maximum latency requirements that cannot be exceeded by a conforming repeater. The maximum permissible latency, combined with the requirements for maximum cable length and restrictions on the number and type of other devices allowed within a collision domain, limits the amount of time that it takes to notify a network device that a collision has occurred, ensuring that the overall 802.3 design criteria is met that all collisions are detected before a complete 64 byte frame is transmitted. If the maximum permissible latency were exceeded by a repeater, then multiple devices in the repeater's collision domain on an 802.3 Ethernet network might broadcast complete frames of data before being notified of a collision. As described above, the broadcast of complete frames when a collision occurs would defeat a scheme for discarding data associated with collisions by simply discarding all partial frames.

Thus, minimizing the latency of a repeater is critical if the repeater is to be implemented on a network in accordance with the 802.3 specification. The 100BaseT standard defines two classes of repeaters: Class I and Class II. At most, a collision domain can include one Class I or two Class II repeaters. Including more than one repeater in a single collision domain is sometimes referred to as cascading repeaters. Specifically, in order to conform to the Class II requirement, the latency a repeater must be less than 46 bit times. It should be noted that the standard is expressed in terms of bit times, or the amount of data that could be transmitted on the network during the latency period.

Network Flexibility LEXIBILITY

The Class II requirement, which allows more than one repeater to be included in a single collision domain, significantly adds flexibility to network topology. Expanding the number of ports available on a network may be accomplished by simply adding a second repeater in the same collision domain as a single existing repeater. No switch is required. By limiting the latency of the two repeaters, it is ensured that collisions can be detected and devices connected to different repeaters can be notified of collisions in time to stop sending data before a complete frame is broadcast.

Because networks tend to constantly change and expand with network devices being added, it would be highly advantageous if, in addition to the Class II feature of allowing two repeaters in a collision domain, it were also possible that each of the two Class II repeaters were expandable or stackable. Additional ports could be added to a first repeater stack that functions as one Class II repeater and then a second stack could be included as a second Class II repeater. Thus, stackability combined with cascadability would provide even greater flexibility for network expansion.

There is therefore a need for a stackable repeater that could be plugged into a network in a flexible manner along with a group of other repeaters in a stack. For a stack of such repeaters to conform to the latency requirements set forth in the standard, a very high speed, efficient repeater stack bus would be required. Specifically, in order to conform to the Class II requirement, the total latency of all of the repeaters in the stack connected to the repeater stack bus must be less than 46 bit times. In order for a high speed bus necessary to meet this criteria to function properly, it would be necessary to ensure proper termination of the bus by the repeaters located at the ends of the bus.

Conventionally, bus termination for a stack of repeaters or a similar group of network devices is implemented using a pair of termination plugs that are plugged into the network devices that are located on the top and bottom of the repeater stack. It should be noted that, for the purpose of this discussion, the bottom repeater is assumed to have no repeater below it connected to its input connector and the top repeater is assumed to have no repeater above it connected to its output connector. As used herein for the purpose of considering bus termination, the designation of the input and output connectors is arbitrary as is the top and bottom designation. Furthermore, the top and bottom designation refers to the position of a repeater on the repeater stack bus and not necessarily the physical position of the repeater. What is important is that the repeaters that reside on the ends of the bus provide termination to the bus. The disadvantage of using termination plugs is that the plugs may or may not be properly plugged in each time that the stack is reconfigured by a system administrator. Similarly, another approach is to provide a small switch on each repeater that may be set by a user when the repeater is located at either end of the stack. Again, this approach has the disadvantage that the user must properly configure the repeater.

What is needed is an automatic system and method for providing termination at the ends of a repeater stack bus. Such a termination system should preferably work regardless of whether or not each of the individual repeaters at the ends of the stack bus happen to be powered on.

SUMMARY OF THE INVENTION

Accordingly, the present invention provides methods and apparatuses for automatic activation of bus termination on a Fast Ethernet repeater stack. Because the top and bottom Fast Ethernet repeaters are determined automatically, it is not necessary for a system administrator to configure the stack or to connect a termination plug to the top and bottom machines. A method for automatically determining which repeaters from of the group of repeaters comprising a Fast Ethernet repeater stack happen to be plugged into the end of the stack is disclosed. When a top repeater and a bottom repeater are identified, a termination circuit is activated and connected to the bus for each of those repeaters so that the bus is terminated at the repeaters at the ends of the stack. This prevents reflections of signals on the bus that would otherwise occur and degrade the performance.

It should be appreciated that the present invention can be implemented in numerous ways, including as a process, an apparatus, a system, a device, a method, or a computer readable medium. Several inventive embodiments of the present invention are described below.

In one embodiment, an automatically activated bus termination circuit in a repeater that is suitable for inclusion in a repeater stack includes an end unit determination circuit. The end unit determination circuit includes a local input connector having an input sense pin. The input sense pin is configured to be connected to an input sense potential when the local input connector is connected to a remote output connector. A local output connector has an output sense pin. The output sense pin is configured to be connected to an output sense potential when the local output connector is connected to a remote input connector. A bus termination circuit is configured to be active when either the input sense pin is not connected to the input sense potential or the output sense pin is not connected to the output sense potential. As a result, the bus termination circuit is activated when the first stack bus connection cable is not connected from the local output connector to a remote input connector or when the second stack bus connection cable is not connected from the local input connector to a remote output connector.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

As noted above, in order for a repeater to meet the Class II requirement, a reliable repeater stack bus would need to be provided. A repeater stack synchronous bus for providing a fast connection among a group of stacked repeaters is disclosed in U.S. Patent application Ser. No. 08/965,479 which was previously incorporated by reference for all purposes. In order for such a repeater stack synchronous bus to work properly, it is necessary that the bus be terminated with a suitable impedence. In one embodiment, the repeater stack synchronous bus is terminated at each end with a 2.5 V pull up termination circuit with an impedance matched to 68 $\Omega \pm 5\%$. In other embodiments, the impedance is matched to 68 $\Omega \pm \pm 10\%$. While repeaters on the ends of the bus are terminated, repeaters in the middle of the bus are not terminated so that signals are not blocked from reaching the other repeaters on the bus.

In one embodiment, the stacked repeaters are connected together with cables. This arrangement is particularly desirable because different repeaters can be plugged, unplugged, or exchanged by simply plugging and unplugging the cables. In contrast, an arrangement where repeaters plug directly into one another offers less convenience and flexibility. When stacked repeater units are reconfigured by changing the order in which the cables are plugged, repeaters on the end of the repeater stack synchronous bus may be moved to the middle of the bus or vice versa.

Figure 2:
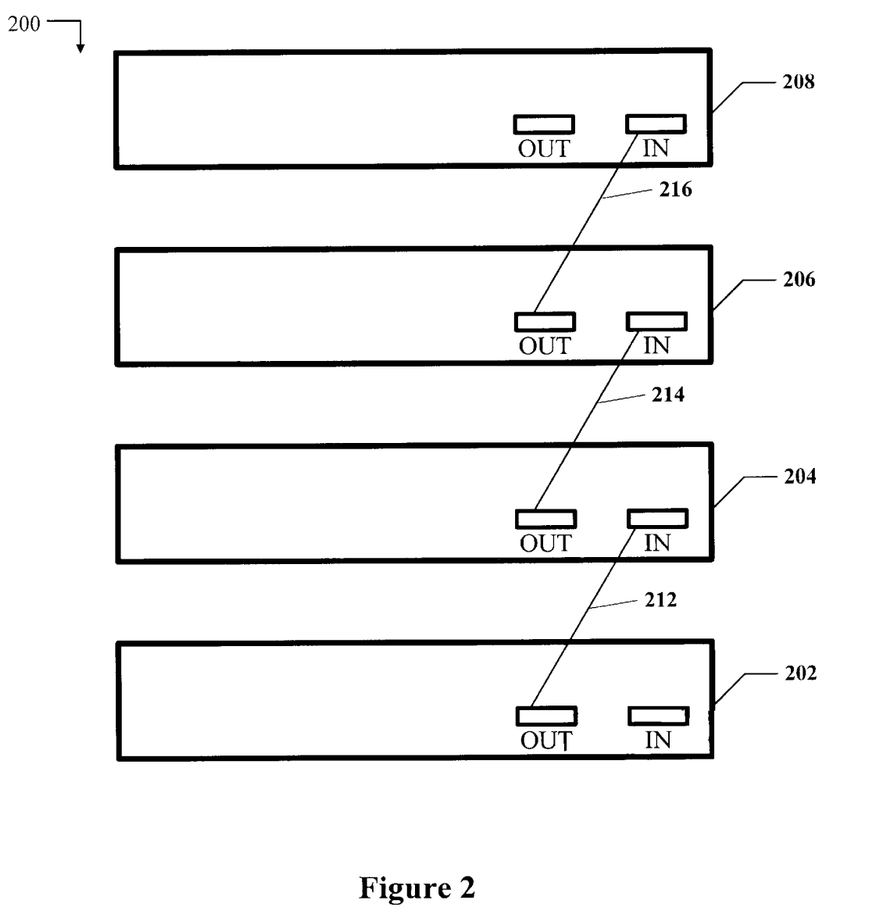
FIG. 2 is a block diagram illustrating a repeater stack.

FIG. 2 is a block diagram illustrating a repeater stack 200. Repeater stack 200 includes a bottom repeater 202, two middle repeaters 204 and 206, and a top repeater 208. Each of the repeaters in the repeater stack are connected to each other via a repeater stack bus that includes a stack bus connection cable 212 connected between repeater 202 and 204, a stack bus connection cable 214 connected between repeater 204 and 206, and a stack bus connection cable 216 connected between repeater 206 and 208. Each of the repeaters includes an input connector and an output connector. The output connector of each repeater in the stack is connected via the stack bus connection cable to the input connector of the repeater above it in the stack. It should be noted that in some embodiments the order of the repeater connectors may be changed. In fact, it is an important advantage of this arrangement that the stack can be reconfigured and the repeaters reordered by simply plugging and unplugging the repeater bus cable.

At the bottom of the repeater stack, repeater 202 has no repeater bus cable connected to its input connector. Likewise, the output connector of repeater 208 at the top of the repeater stack is not connected. As noted above, the conventional way of terminating the repeater stack bus would be to require that a bus termination plug be connected to the input connector of repeater 202 and the output connector of repeater 208. In one embodiment, the present invention eliminates the need to provide termination plugs on these connectors by including in each repeater an end unit determination circuit that senses whether or not a stack bus cable is connected to both the input connector and the output connector of the unit. If a bus termination cable is not connected to both the input connector and the output connector of a repeater unit, then that repeater unit automatically activates a bus termination circuit to properly terminate the repeater stack bus.

Figure 3:
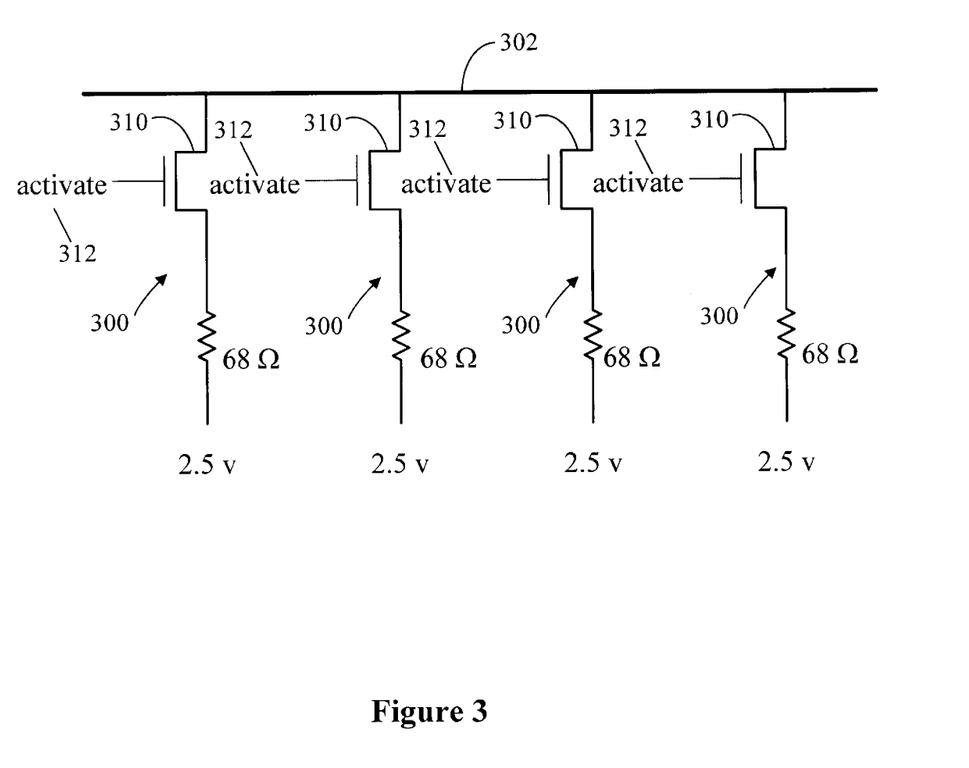
FIG. 3 is a schematic diagram illustrating a bus termination circuit implemented on each of four repeaters in a repeater stack.

FIG. 3 is a schematic diagram illustrating a bus termination circuit 300 implemented on each of four repeaters in a repeater stack in one embodiment. In each of the repeaters, bus termination circuit 300 is connected to a repeater stack bus 302. In the embodiment shown, each bus termination circuit includes a 68 Ω termination resistor connected to a pull-up voltage of 2.5 volts. In other embodiments, other termination resistors or pull-up voltages including ground are used. The 68 Ω resistor and 2.5 pull-up voltage are either connected or isolated from the repeater stack bus in each repeater by an MOS switch 310. Each MOS switch is controlled by an activate signal 312. The state of the activate signal is determined by whether or not cables are plugged in to both the input and output connectors on the repeater. The generation of the activate signal is described in further detail in FIG. 4. Thus, for each of the four repeaters, a bus termination circuit is included that is connected to or isolated from the bus depending on the state of the activate signal. The activate signal is driven high for the repeaters on the end of the stack bus so that the stack bus is properly terminated.

It should be noted that, although the stack bus is depicted as a single line in FIG. 3 for the purpose of illustration, the stack bus generally consists of a plurality of wires carrying data, each of which is terminated. In one embodiment, 21 separate data lines are terminated using termination circuit 300.

It is important that the termination circuit be activated even when one or both of the end units is powered off. Otherwise, a powered off end unit would not be terminated and would reflect signals back onto the bus. In order to ensure that the end unit determination circuit and the bus termination circuit for each repeater functions even when the repeater is powered off, termination power is provided to each repeater in the stack via the stack bus connection cable. One of the pins on the stack bus connection cable input connector and output connector is dedicated to providing the termination voltage and one of the repeaters in the stack is elected to provide power to the termination voltage pin.

In one embodiment, termination power is provided by the first unit in the stack that is powered on. The first unit in the stack that is powered on provides termination power to the entire stack bus and the termination power is used to provide power to both the end unit determination circuit and the bus termination circuit in each of the repeaters. In one embodiment, the termination voltage is nominally 5 volts. Because of a switching circuit used to deliver the termination voltage to the bus, in a preferred embodiment, the bus termination voltage is approximately 4 volts. If the unit providing power is powered off, then a different unit is elected to provide power to the end unit determination circuits via the stack bus. In general, if any one repeater unit is turned on, then that repeater unit provides power to the repeater stack bus so that power may be provided for bus termination at the ends of the bus regardless of whether or not the repeaters on the ends of the bus are powered on.

In one embodiment, the selected repeater unit that provides power for bus termination is the same repeater unit that is selected to be the clock master unit as is described in U.S. patent application serial No. 08/965,460 which is herein incorporated by reference for all purposes. In another embodiment, power is supplied to each of the bus termination circuits from the repeater stack bus using a separate dedicated supply.

Figure 4:
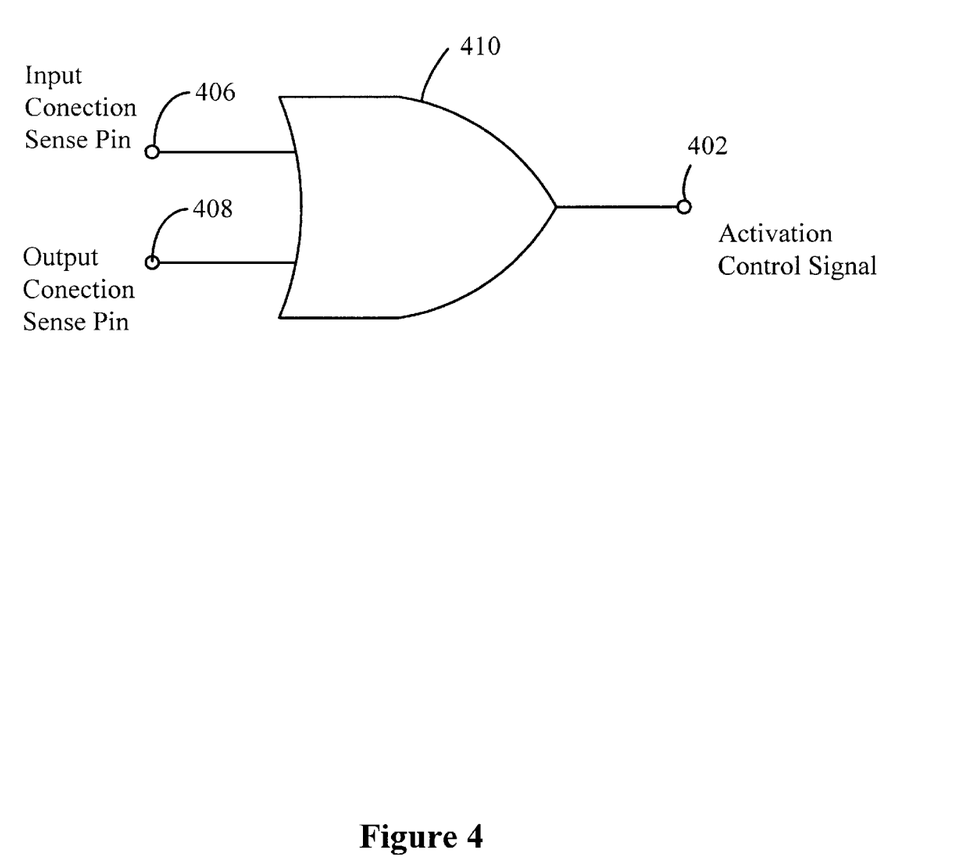
FIG. 4 is a schematic diagram illustrating an end unit determination circuit used in one embodiment.

FIG. 4 is a schematic diagram illustrating an end unit determination circuit used in one embodiment. Each repeater in the repeater stack includes such a circuit. A bus termination circuit activation control signal 402 is generated from an input connection sense signal (also referred to as a "bottom" signal) carried on an input connection sense pin 406 and an output connection sense signal (also referred to as a "top" signal) carried on an output connection sense pin 408. Input connection sense pin 406 is located on the cable input connector of the repeater. Input connection sense pin 406 is grounded when the cable input connector has another repeater connected to it via a stack bus connector cable. When no repeater is connected, then input connection sense pin 406 is soft pulled high. This is shown in more detail in FIG. 5. Thus, the input connection sense pin indicates whether or not the repeater is at the bottom end of the repeater stack. If the input connection sense pin is high, the repeater is the bottom repeater. If the input connection sense pin is low, then the repeater is not the bottom repeater.

Similarly, output connection sense pin 408 is grounded when the cable output connector has another repeater connected to it via a stack bus connector cable. When no repeater is connected, then output connection sense pin 408 is soft pulled high. This is shown in more detail in FIG. 5. Thus, the output connection sense pin indicates whether or not the repeater is at the top end of the repeater stack. If the output connection sense pin is high, the repeater is the top repeater. If the output connection sense pin is low, then the repeater is not the top repeater.

If either the input connection sense pin or the output connection sense pin is high, then the repeater is either the top repeater or the bottom repeater in the repeater stack. Therefore, its bus termination circuit should be activated. In the embodiment shown, the input connection sense pin and the output connection sense pin are both connected to an OR gate. The output of the OR gate is the bus termination circuit activation control. Therefore, if either of the sense pins is high, then the bus termination circuit activation control signal is high and if both sense pins are grounded then the bus termination circuit activation control signal is also grounded.

When bus termination circuit activation control signal 402 goes high, then activate signal 312 in FIG. 3 is driven high to connect bus termination circuit 300 to bus 302 via switch 310. This is implemented different ways in different embodiments. In one embodiment, the output of OR gate 410 is used directly as the activate signal applied to switch 310. In some embodiments, it may be desirable to isolate the bus termination circuit activation control signal from the MOS switch. It should be noted that these circuits may be implemented in many ways in other embodiments in accordance with the spirit of the invention.

Figure 5:
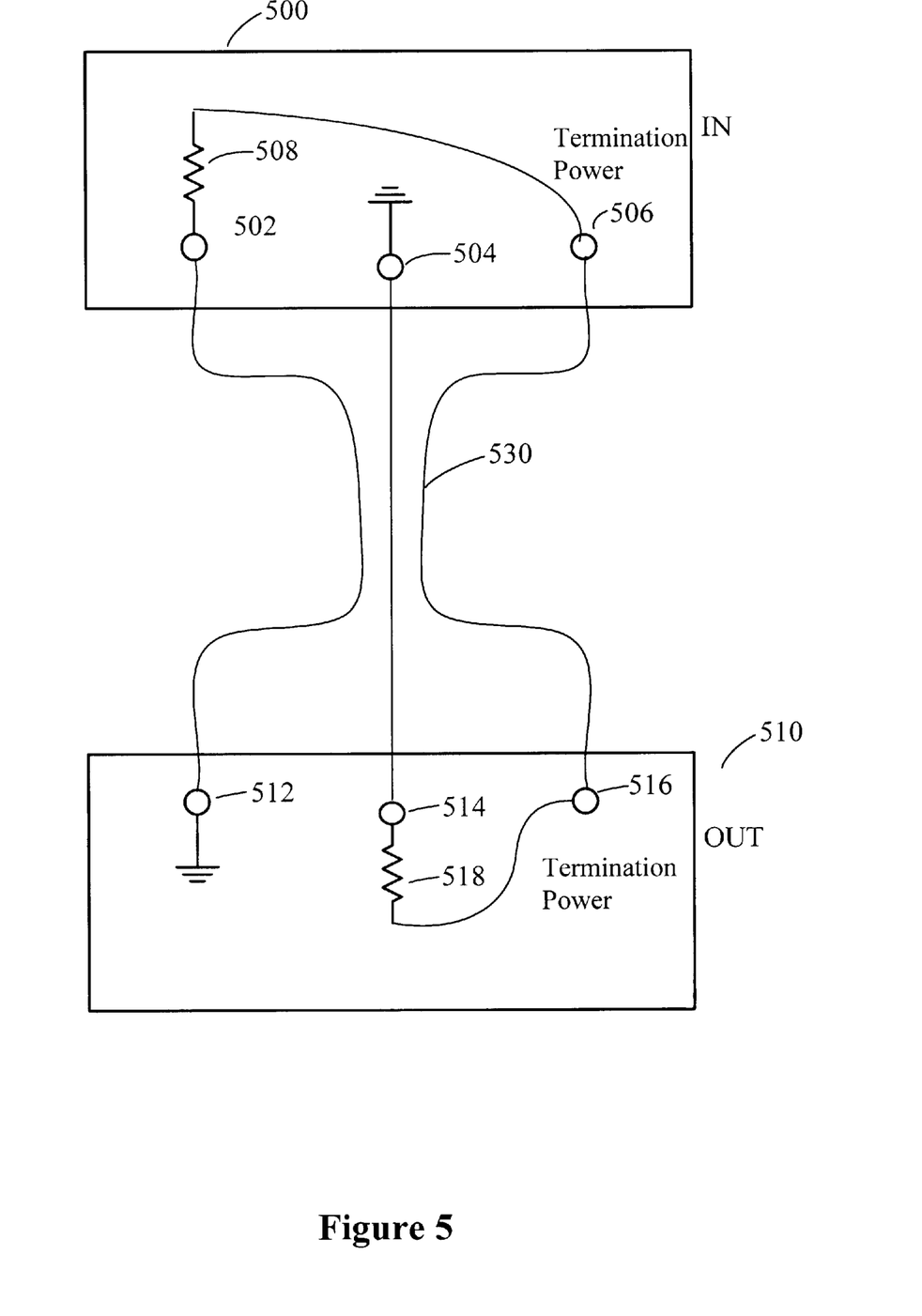
FIG. 5 is a schematic diagram illustrating the end unit determination pins and the termination power pin included on the input and output stack bus connection sockets for two repeaters.

FIG. 5 is a schematic diagram illustrating the end unit determination pins and the termination power pin included on the input and output stack bus connection sockets for two repeaters. Input connection socket 500 includes a bottom sense pin 502, a grounded pin 504 and a power pin 506. Power pin 506 is connected to the termination power. As noted above, the termination power is preferably supplied by one repeater in the stack that is powered on so that all of the other repeaters in the stack may run an end unit determination circuit and a bus termination circuit even when powered off. Termination power is carried between repeaters via the power pins on their input and output connection sockets. If a repeater happens to be the repeater that supplies power to the repeater stack bus, then a 5V power supply in that repeater is connected to the termination power pins on that repeater's input and output connection sockets. Otherwise, a repeater that is not the repeater that is providing power to the repeater stack bus may draw power from either or both of the termination power pins.

Output connection socket 510 includes a grounded pin 512, a top sense pin 514, and a power pin 516. Power pin 516 is connected to the termination voltage. Input connection sense pin 406 on the input cable connector is connected through the cable to the grounded pin 512 on the output cable connector. Grounded pin 512 is grounded whenever the output cable connector is plugged into a repeater output connector. The grounded signal is connected to input connection sense pin 406 on the input cable connector so that it may be sensed by the repeater end unit determination circuit inside the repeater into which input connector 500 is plugged.

Bottom sense pin 502 is connected to a soft pull up voltage of the termination power through a resistor 508. In the embodiment shown, resistor 508 is shown directly connected to termination power pin 506. In other embodiments, an indirect connection to a voltage source that is powered by power pin 506 or by some other power source may be used. As noted above, the termination voltage is nominally about 5V and in one embodiment the termination voltage is 4.5V. Typically resistor 508 is about 1 kΩ so that input connection sense pin 406 may be easily grounded. Likewise, top sense pin 514 is connected to a soft pull up voltage of the termination power through a resistor 518. Typically resistor 518 is also about 1 kΩ so that output connection sense pin 408 may be easily grounded.

A stack bus connection cable 530 is shown connecting input connection socket 500 to output connection socket 510. As a result, pin 502 is connected to pin 512, pin 504 is connected to pin 514 and pin 506 is connected to pin 516. When the cable is connected, then grounded pin 512 overcomes the soft pull up voltage on pin 502 so that pin 502 changes from high to ground. Likewise, grounded pin 504 overcomes the soft pull up voltage on pin 514 so that pin 514 changes from high to ground. Therefore, pin 502 senses that another repeater is connected to input connection socket 500 and pin 514 senses that another repeater is connected to output connection socket 510.

It should be noted that, for purposes of clarity, only three pins are shown on each of the input and output connection sockets and only three wires are shown for the connection cable. In one embodiment, 64 pin connection standard SCSI sockets are used with a 68 Ω controlled impedance cable that includes 64 individual wires. The other pins and wires are not shown in FIG. 5 so that the invention is not unnecessarily obscured in detail.

In the embodiment shown, each repeater in the stack senses the presence of other repeaters in the stack connected to it through its input and output connectors by determining whether a pull up voltage is grounded. In other embodiments, other methods of determining whether another repeater is present are used. For example, in one embodiment, a cable loopback inside each repeater chassis is provided. When the loopback is detected, then it is determined that the repeater is connected. Also, it should be noted that in the embodiment shown, the input and output connection sockets pins are different and the cable plugs are the same so that the cable may be reversed. It is also possible to make the sense pins on the connection sockets the same and cross the wires in the cable so that the respective ground pins are connected to the proper sense pins on the other side. The embodiment shown in FIG. 5 is preferred because the cable may be reversed and because of cost.

Figure 6:
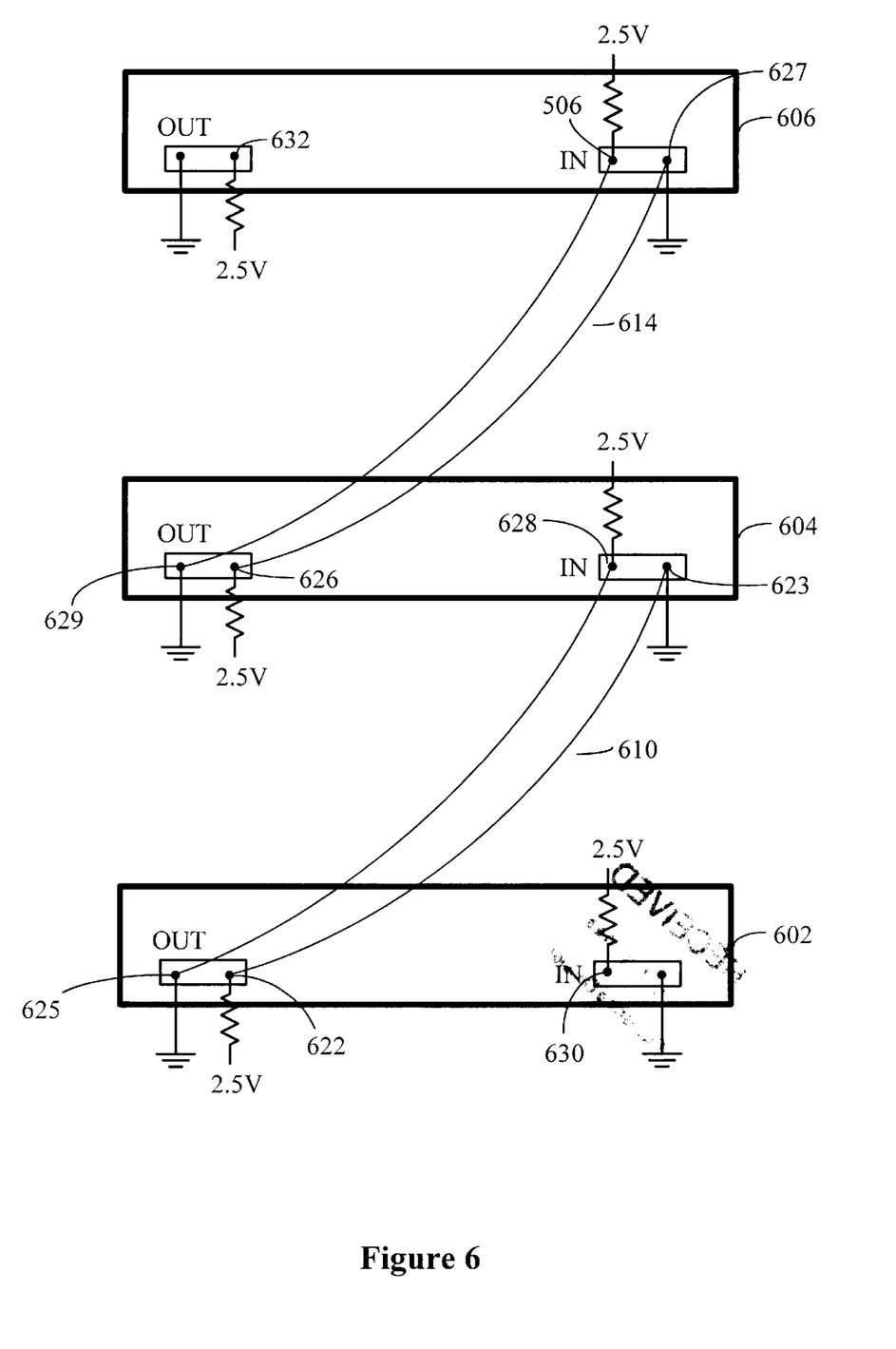
FIG. 6 is a block diagram illustrating a stack of three repeaters connected via stack bus connection cables.

FIG. 6 is a block diagram illustrating a stack of three repeaters 602, 604 and 606 connected via stack bus connector cables 610 and 614. Stack bus connector cable 610 connects an output sense connector pin 622 on repeater 602 to a ground pin 623 on repeater 604. Likewise, stack bus connector cable 610 connects an input sense connector pin 624 on repeater 604 to a ground pin 625 on repeater 602 and stack bus connector cable 614 connects an output sense connector pin 628 on repeater 606 to a ground pin 629 on repeater 604.

For bottom repeater 602, input sense connector pin 630 is not connected to a ground pin on a repeater because repeater 602 is the bottom repeater on the stack. Therefore, input connection sense pin 630 is pulled high by a soft pull up voltage. As a result, the activation control signal in the end unit determination circuit for repeater 602 is high and the bus termination circuit inside repeater 602 is activated. For middle repeater 604, both input sense connector pin 624 and output sense connector pin 626 are grounded so that the activation control signal in the end unit determination circuit for repeater 604 is low and the bus termination circuit inside repeater 604 is not activated. For top repeater 606, output sense connector pin 632 is not connected to a ground pin on a repeater because repeater 606 is the top repeater on the stack. Therefore, output connection sense pin 630 is pulled high by a soft pull up voltage and the activation control signal in the end unit determination circuit for repeater 606 is also high. As a result, the bus termination circuit inside repeater 606 is activated. Thus, as is desired, the top and bottom repeaters in the stack terminate the bus and the middle repeater does not.

An automatic bus termination scheme has been shown for a stack of repeaters. Each repeater includes an end unit determination circuit that generates an activation control signal which indicates whether or not the repeater is located at either the bottom or the top of the repeater stack. If the repeater is located at one of the ends of the stack, then a bus termination circuit is activated either directly or indirectly using the activation control signal. Thus, no manual switch or termination plug need be used to terminate the ends of the repeater stack bus.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An automatically activated bus termination circuit in a repeater that is suitable for inclusion in a repeater stack including:

an end unit determination circuit wherein the end unit determination circuit includes:

a local input connector having an input sense pin, the input sense pin being configured to be connected to an input sense potential when the local input connector is connected to a remote output connector;

a local output connector having an output sense pin, the output sense pin being configured to be connected to an output sense potential when the local output connector is connected to a remote input connector; and a bus termination circuit, the bus termination circuit being configured to be active when either the input sense pin is not connected to the input sense potential or the output sense pin is not connected to the output sense potential;

whereby the bus termination circuit is activated when the local output connector is not connected to a remote input connector or when the local input connector is not connected to a remote output connector.

2. An apparatus as recited in claim 1 further including:

a first stack bus connection cable configured to connect the local input connector to the remote output connector, the first stack bus connection cable connecting the input sense pin to the input sense potential; and a second stack bus connection cable configured to connect the local output connector to the remote input connector, the second stack bus connection cable connecting the output sense pin to the output sense potential.

3. An apparatus as recited in claim 1 wherein the repeater is a Fast Ethernet repeater.

4. An apparatus as recited in claim 1 wherein the repeater is a 100BaseT Fast Ethernet repeater.

5. An apparatus as recited in claim 1 wherein the input sense potential is ground.

6. An apparatus as recited in claim 1 wherein a soft pull up voltage is connected to the input sense pin.

7. An apparatus as recited in claim 1 wherein a soft pull up voltage is connected to the output sense pin.

8. An apparatus as recited in claim 1 wherein the local input connector includes an input connector termination power pin and wherein the bus termination circuit draws power from the input connector termination power pin.

9. An apparatus as recited in claim 1 wherein the local output connector includes an output connector termination power pin and wherein the bus termination circuit draws power from the output connector termination power pin.

10. An apparatus as recited in claim 1 wherein the local input connector includes an input connector termination power pin and wherein the end unit determination circuit draws power from the input connector termination power pin.

11. An apparatus as recited in claim 1 wherein the local output connector includes an output connector termination power pin and wherein the end unit determination circuit draws power from the output connector termination power pin.

12. An apparatus as recited in claim 1 wherein the bus termination circuit has an impedance of about 68 ohms and a voltage of about 2.5 V.

13. A method of selectively terminating a circuit in a repeater that is suitable for inclusion in a repeater stack including:

determining whether the repeater is an end unit, including:

sensing an input sense potential wherein the input sense potential indicates whether a local input connector is connected to a remote output connector; and sensing an output sense potential wherein the output sense potential indicates whether a local output connector is connected to a remote input connector; and selectively activating a bus termination circuit when either the input sense potential indicates that the local input connector is not connected to a remote output connector or the output sense potential indicates that the local output connector is not connected to a remote input connector;

whereby the bus termination circuit is activated when the repeater is an end unit in the repeater stack.

14. A method as recited in claim 13 wherein the repeater is a Fast Ethernet repeater.

15. A method as recited in claim 13 wherein the repeater is a 100BaseT Fast Ethernet repeater.

16. A method as recited in claim 13 wherein the input sense potential is ground when the local input connector is connected to the remote output connector.

17. A method as recited in claim 13 wherein the input sense potential is pulled up softly from ground when the local input connector is not connected to the remote output connector.

18. A method as recited in claim 13 wherein the output sense potential is ground when the local output connector is connected to the remote input connector.

19. A method as recited in claim 13 wherein the output sense potential is pulled up softly from ground when the local output connector is not connected to the remote input connector.

20. A method as recited in claim 13 further including providing power to the bus termination circuit of a powered off repeater from a powered on repeater.

* * * * *